United States Patent [19]
Beasley et al.

[11] Patent Number: 5,924,022
[45] Date of Patent: Jul. 13, 1999

[54] RF REPEATER FOR TDMA MOBILE TELEPHONE SYSTEMS

[75] Inventors: Andrew Beasley, Lake Errock; Dean Schebel, Burnaby, both of Canada

[73] Assignee: PCS Microcell International, Bridgetown, Barbados

[21] Appl. No.: 08/573,817

[22] Filed: Dec. 18, 1995

[30] Foreign Application Priority Data

Sep. 15, 1995 [CA]  Canada ................................. 2158386

[51] Int. Cl.$^6$ .................................................. H04Q 7/20
[52] U.S. Cl. .................. 455/218; 455/6.3; 455/11.1; 455/67.1; 455/562; 370/315
[58] Field of Search ........................... 455/11.1, 20, 562, 455/277.1, 277.2, 212, 218, 517, 3.1, 4.1, 4.2, 5.1, 6.1, 6.2, 6.3, 282, 222, 561, 67.1, 423; 370/315, 321; 348/6–13

[56] References Cited

U.S. PATENT DOCUMENTS

| | | | |
|---|---|---|---|
| 4,704,734 | 11/1987 | Menich et al. | 455/562 |
| 4,713,809 | 12/1987 | Mizota | 370/315 |
| 4,742,530 | 5/1988 | Kawai | 370/315 |
| 5,200,955 | 4/1993 | McFarlane et al. | 370/315 |
| 5,321,736 | 6/1994 | Beasley | 455/11.1 |
| 5,521,904 | 5/1996 | Eriksson et al. | 455/67.1 |
| 5,602,555 | 2/1997 | Searle et al. | 455/562 |
| 5,701,579 | 12/1997 | Dolan et al. | 455/282 |

FOREIGN PATENT DOCUMENTS 2058737  7/1993  Canada.

*Primary Examiner*—Dwayne D. Bost
*Assistant Examiner*—Nay Maung
*Attorney, Agent, or Firm*—Knobbe Martens Olson & Bear, LLP

[57] ABSTRACT

An RF repeater for exchanging time division multiple access (TDMA) transmit and receive signals between a mobile handset and a CATV plant or other signal conduit has a signal timing detector responsive to the timing of transmit signals being broadcast to the handset to provide timing information indicative of the timing of receive signals being received from the handset. A signal level detector responsive to the signal level of the receive signals provides signal level information. A signal control device responsive to the timing information and the signal level information provides a signal level control output for time slotted control of the receive signals. The timing and signal level information may be used to effect diversity selection between receive signals from two spaced antennas at the repeater and/or diversity selection may be effected between two versions of the receive signal at a base station after passing through the signal conduit.

14 Claims, 10 Drawing Sheets

RF REPEATER FOR TDMA MOBILE TELEPHONE SYSTEMS

BACKGROUND OF THE INVENT

1. Field of the Invention

The present invention relates to RF repeaters for exchanging time division multiple access (TDMA) transmit and receive signals between a mobile handset and a signal conduit, e.g. a co-axial cable or an optical fiber cable in a cable television (CATV) plant, in a time division multiple access (TDMA) telephone system.

2. Description of the Related Art

It is known to provide telephone communication to a mobile telephone handset by connecting one or more RF repeaters in the form of remote antenna drivers (RADs) through a CATV plant to a remote antenna signal processor (RASP) and a base station. The base station interfaces with a public switched telephone network and provides TDMA transmit signals through the CATV plant to the RF repeaters for transmission as radio signals to the handset. From the handset, receive signals, the timing of which is slaved by the handset to that of the transmit signals, are transmitted as radio signals to the RADs, from which they are passed through the CATV plant to the base station for conversion and connection to the public switched telephone network.

The base station supplies the transmit signals at a first predetermined frequency to the RASP, at which the transmit signals are frequency converted to a second or intermediate frequency, filtered and again frequency converted to a third frequency, which is suitable for transmission through the CATV plant to the RADs. At the RADs, the transmit signals are frequency converted to the intermediate frequency, filtered and then frequency converted back to the first frequency, at which they are transmitted as radio signals to the handset. The receive signals are similarly frequency converted in the reverse direction.

With this arrangement, there may be a significant limitation in the cable plant in that the upstream cable path, i.e. the return path from the RF repeaters to the RASP, may be limited in dynamic range to a value much less than the dynamic range of the mobile handset and the base station. For example, the dynamic range of the latter may be in the order of 70 dB, but the range of the upstream cable path is often less than 40 dB.

This limitation is significant in providing cell coverage, as it is often the limiting factor in a two-way communication system. The downstream cable path, i.e. the transmit signal path from the RASP to the RF repeaters, does not display the same limitation. Cell size (or coverage range) is vital as it determines the viability of system deployment, and determines how many potential subscribers to the service can be reached.

There is a second limitation of active RF repeaters in a CATV based TDMA telephone system where more than one cell is used to provide extended coverage (simulcast). This second limitation is the effect of cumulative noise figures due to each of the repeaters using the same frequency band. The greater the number of RF repeaters used, and thus the larger the coverage area, the greater the cumulative noise. This noise acts to reduce the dynamic range, and thus to reduce the coverage area.

Spatial diversity at the RF repeater can be used to offset the effect of path fading that will occur on a single receive antenna. Thus, the use of a second antenna spaced at an optimum distance from the first will provide a second or diversity channel that can be presented to the base station so that the base station can use the best of the two channels, if required. This diversity option has the effect of extending relative coverage area in the receive (upstream) direction. One method to transport this diversity channel is to frequency convert it on the upstream path to a frequency band separate from that of the main channel, and then to transport them both back to the base station through the CATV upstream path. However, this has the disadvantage of requiring twice the bandwidth to be utilized on the upstream cable plant.

A fourth problem exists when transporting a receive (upstream) signal through the CATV upstream path. This observed problem is that the noise floor of the CATV upstream path tends to change dynamically over time, and can be worse in some portions of the upstream path than in others. This change in the noise present in the transport channel can cause the relative signal-to-noise ratios at the base station to change over time.

All four limitations are further complicated by the TDMA nature of the signal, and the consequential requirement for time slotted analysis of each situation.

BRIEF SUMMARY OF THE INVENTION

The present invention is based on an understanding by the present inventors that the timing of a receive signal in the receive signal path of an RF repeater can be derived from that of a transmit signal in the transmit signal path of the RF repeater, thus enabling the receive signal level to be detected and processed on a time slotted basis, so that the receive signal can be processed, e.g. by diversity selection, to counteract distortion of the receive signal.

More particularly, according to the present invention, the timing of the TDMA receive signal is derived from an analysis of the transmit signal. Since the receive signal is slaved off of the transmit signals at the mobile handset, the receive signal timing can thus be determined from that of the transmit signal, within certain bounds allowing for timing slippage due to propagation delays and timing advances sent from the base station.

When the timing of the receive signal has thus been obtained, the receive signal can be measured for signal strength on a time slotted, individual channel basis, at the RF repeater to enable diversity selection, signal combination, signal attenuation or other signal processing.

In a preferred embodiment of the invention, a method of exchanging TDMA signals between a base station and a mobile TDMA handset comprises the steps of supplying a TDMA transmit signal from the base station through a signal conduit, e.g. a CATV plant, to an RF repeater, detecting the timing of the transmit signal at the RF repeater, transmitting the transmit signal as radio signals from the RF repeater to the handset, and transmitting TDMA receive signal from the handset to the RF repeater. The timing of the receive signal is slaved to the transmit signals by the handset. By receiving the receive signal at a pair of spaced-apart antennas, corresponding first and second receive signals are provided at the RF repeater. The signal levels of the first and second receive signals are detected and are processed, using the transmit signal timing, to provide a control output, which is employed to alter the signal level of at least one of the first and second receive signals, which is then supplied to the base station. The control output may, for example, be employed to squelch, or to increase the level of, the receive signal having the lowest signal level.

The timing and receive signal level information can thus be employed to effect diversity selection between the first and second receive signals before the receive signals pass from the RF repeater into the signal conduit. This diversity selection of one of the first and second receive signal on a time slotted basis selects that one of these signals which has the higher signal strength, so that a reduction of 50% of the required band width on the signal conduit is obtained by not passing the other of the these signals to the signal conduit.

Another possibility is to frequency-convert the first and second receive signals to different frequencies at the RF repeater before passing them through the signal conduit, and to effect diversity selection of one of these two signals at the base station. This enables the diversity selection to be used to counteract frequency band-specific noise on the signal conduit. This base station diversity selection may also be combined with the above-described diversity selection at the RF repeater.

BRIEF DESCRIPTION OF THE DRAWINGS

Further objects, features and advantages of the present invention will become more readily apparent to those skilled in the art from the following description thereof when taken in conjunction with the accompanying drawings, in which.

DESCRIPTION OF THE PREFERRED EMBODIMENTS

Figure 1:
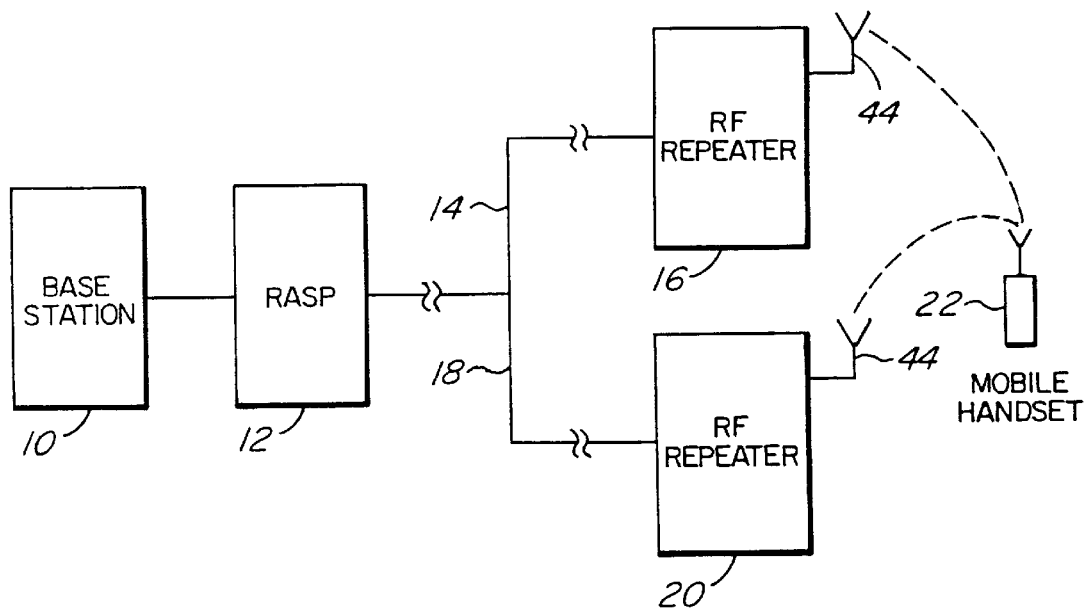
FIG. 1 shows an RF repeater arrangement comprising a pair of RF repeaters connected to a common RASP.

Referring firstly to FIG. 1, there is shown a base station 10 for connection to a public switched telephone network (not shown). The base station 10 is a commercially available base station and is therefore not described in detail herein. The base station 10 is connected through a RASP 12 and a coaxial cable 14 forming part of a CATV plant to a RF repeater 16. The cable 14 is connected through a further cable 18 to a second RF repeater 20.

Figure 2:
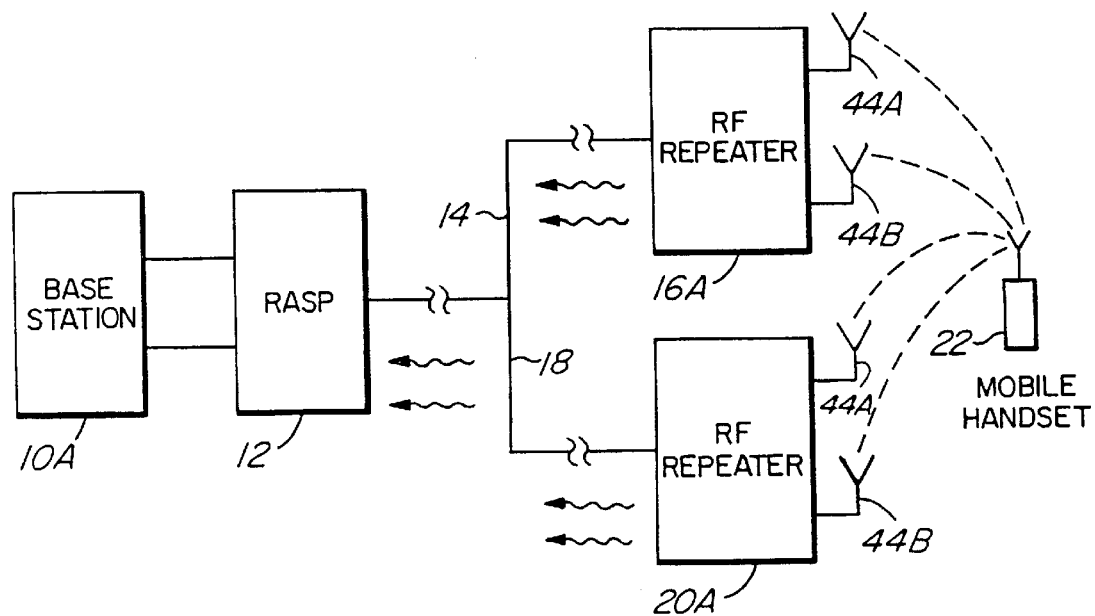
FIG. 2 shows a modification of the RF repeater arrangement of FIG. 1, in which two RF repeaters, each employing a pair of antennas with diversity selection are connected to the RASP and the base station.

FIG. 2 shows a modification of the arrangement of FIG. 1. In the modification of FIG. 2, the RF repeaters 16 and 20 of FIG. 1, which are each single antenna RADs, have been replaced by RF repeaters 16A and 20A which, as described in greater detail below, are each dual-antenna RADs. The base station 10 of FIG. 1 has in this case been replaced by another commercially available base station 10A which is capable, in known manner, of effecting diversity selection of two receive signals, for the purpose described below.

Figure 3:
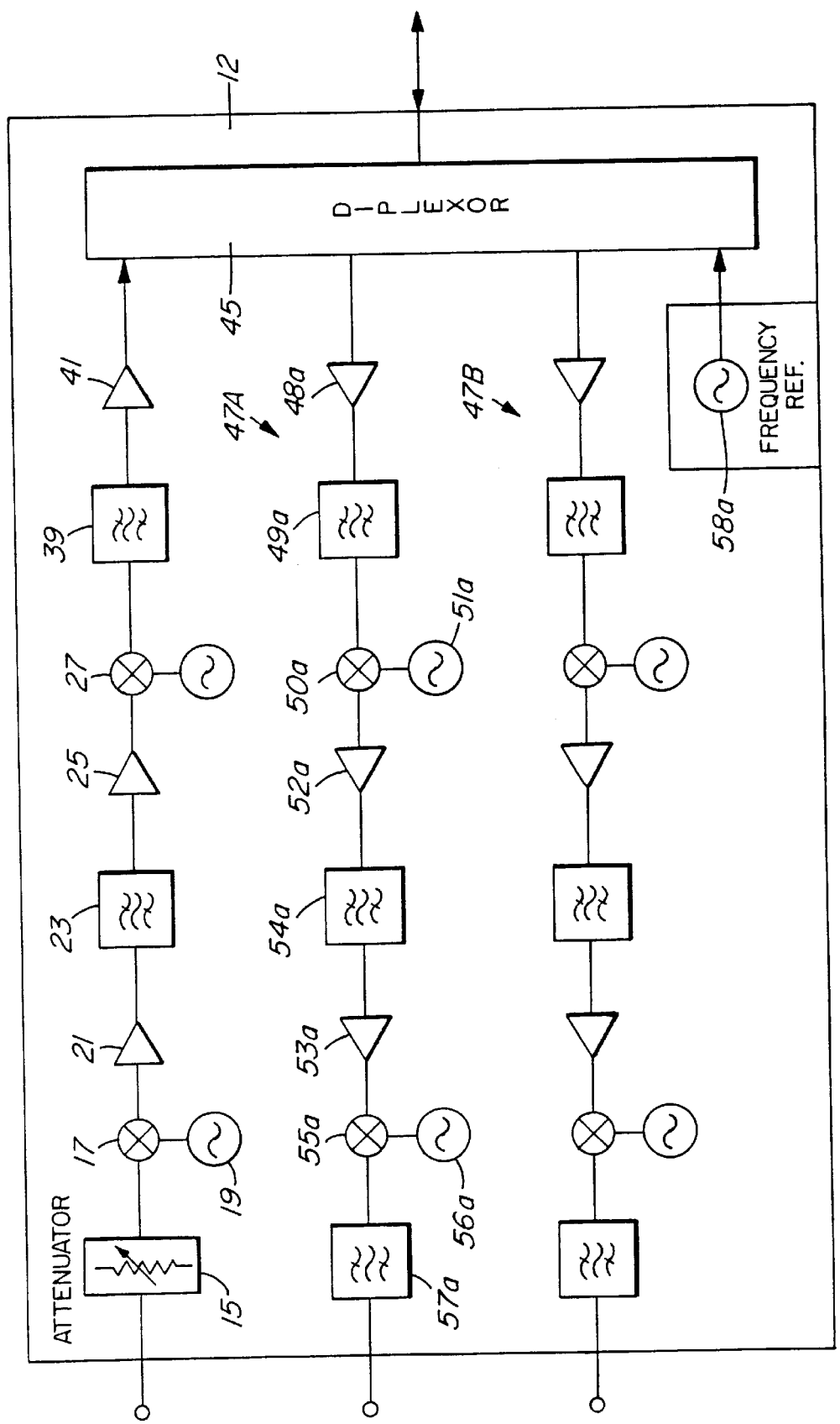
FIG. 3 shows a circuit diagram of the RASP of FIGS. 1 and 2.

The RASP 12 receives transmit signals broadcast from the base station 10 or 10A at a first frequency F1, and, as shown in FIG. 3, includes an attenuator 15 for attenuating the signals and a mixer 17 and an oscillator 19 which frequency-convert these transmit signals to a second, intermediate frequency F2. The mixer 17 is followed by an amplifier 21, a bandpass filter 23 and a further amplifier 25 for amplifying and filtering the transmit signals, which are then frequency-converted by a further mixer 27 and an oscillator 29 to a third frequency F3. The transmit signals are then further filtered by a bandpass filter 39 and amplified by an amplifier 41 before passing through a diplexor to the downstream CATV plant comprising the cables 14 and 18 and to the RF repeaters 16 and 20 or 16A and 20A. The frequency F3 is selected to be suitable for transmission over the CATV plant. At the RF repeaters, the transmit signals are modulated and broadcast as radio signals to the handset 22.

In the upstream or receive signal path, the radio signals transmitted by the handset 22 are received and redemodulated by the RF repeaters and supplied through the CATV plant to the diplexor 45 of the RASP 12.

The RASP 12 has two upstream or return signal paths, which are indicated generally by reference numerals 47A and 47B, respectively, for processing the receive signals from the respective RF repeaters 16 and 20 or 16A and 20A. The signal paths 47A and 47B are similar to one another and only one of them, therefore, will be described in greater detail.

The signal path 47A has an amplifier 48a and a bandpass filter 49a for amplifying and filtering the respective receive signal, followed by a mixer 50a with an oscillator 51a for frequency-converting the receive signal from the frequency F3 to the intermediate frequency F2.

The mixer 53 is followed by a pair of amplifiers 52a and 53a and a further bandpass filter 54a for amplifying and filtering the intermediate frequency receive signal, which is then frequency-converted by a further mixer 55a and an oscillator 56a to the frequency F1.

Following further filtering by filter 57a, the receive signal is supplied from the RASP 12 to the base station 10.

An oscillator 58a provides a reference frequency to the diplexor 45.

Figure 4:
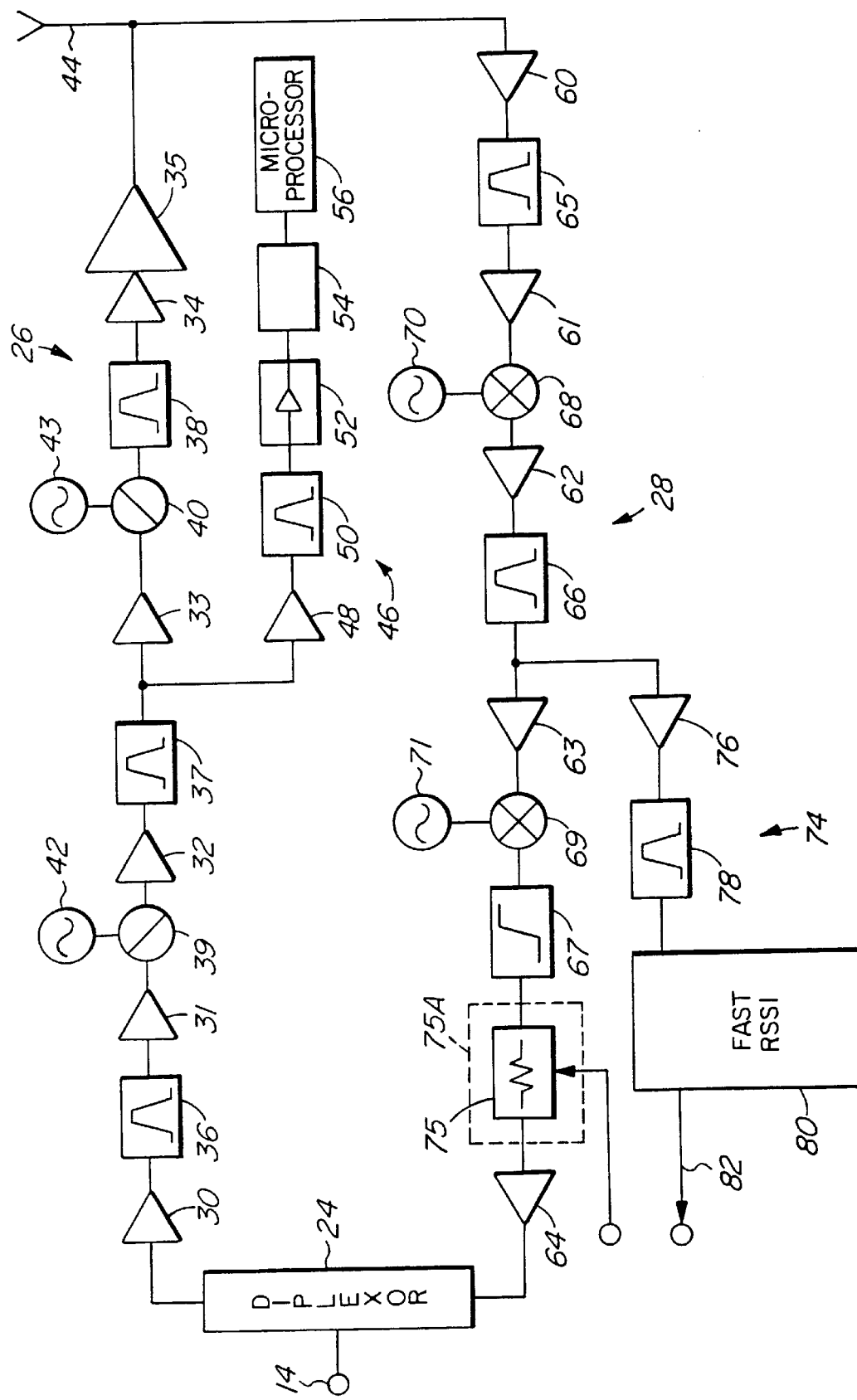
FIG. 4 shows a block diagram of one of the RF repeaters of FIG. 1.

The RF repeater 16 is illustrated in greater detail in FIG. 4. Since the RF repeater 20 is identical to the RF repeater 16, the RF repeater 20 is not illustrated or described herein in detail, and it is accordingly to be understood that the following description of the RF repeater 16 also applies to the RF repeater 20.

The RF repeater 16 has a diplexor 24 for connecting the cable 14 to a transmit or downstream signal path indicated generally by reference numeral 26 and to a receive signal or upstream path indicated generally by reference numeral 28.

The transmit signal path 26 includes RF amplifiers 30 through 35, bandpass filters 36 through 38 and mixers 39 and 40, with oscillators in the form of phase locked loop synthesizers 42 and 43 connected to the mixers 39 and 40, for supplying modulated transmit signals to antenna 44 in a manner which will be familiar to those skilled in the art.

The output of the bandpass filter 37 is connected to a transmit signal timing detector indicated generally by reference numeral 46, which comprises an amplifier 48, a SAW filter 50, an RF diode detector 52 and a comparator 54.

The transmit signal timing detector 46 taps off a small portion of the transmit signal from the transmit signal path 26, which is then amplified by the amplifier 48 and passed through the diode detector 52 to determine the envelope of the signal. The output of the signal timing detector 46 is then provided as receive signal timing information to a microprocessor 56, the function of which is described in greater detail below.

The receive signal path 28 has amplifiers 60 through 64, bandpass filters 65 and 66, a low pass filter 67 and mixers 68 and 69, with oscillators in the form of phase locked loop synthesizers 70 and 71 connected to the mixers 68 and 69. Thus, in a manner which will likewise be apparent to those skilled in the art, the receive signal channel 28 serves to amplify, filter and demodulate receive signals received by the antenna 44 from the mobile handset 22.

In addition, the receive signal path 28 includes a signal level detector indicated generally by reference numeral 74, which comprises an RF amplifier 76, a SAW filter 78 and a fast relative signal strength indicator circuit (RSSI) 80. The signal level detector 74 provides, at an output conductor 82 of the relative signal strength indicator circuit 80, signal level information representing the signal level of the receive signals, and this signal level information is supplied to the microprocessor 56.

An attenuator 75 is connected between the filter 67 and the amplifier 64 for attenuating the receive signal as described below in the present embodiment of the invention, but may be replaced by a squelch circuit shown in broken lines and indicated by reference numeral 75A.

Figure 5:
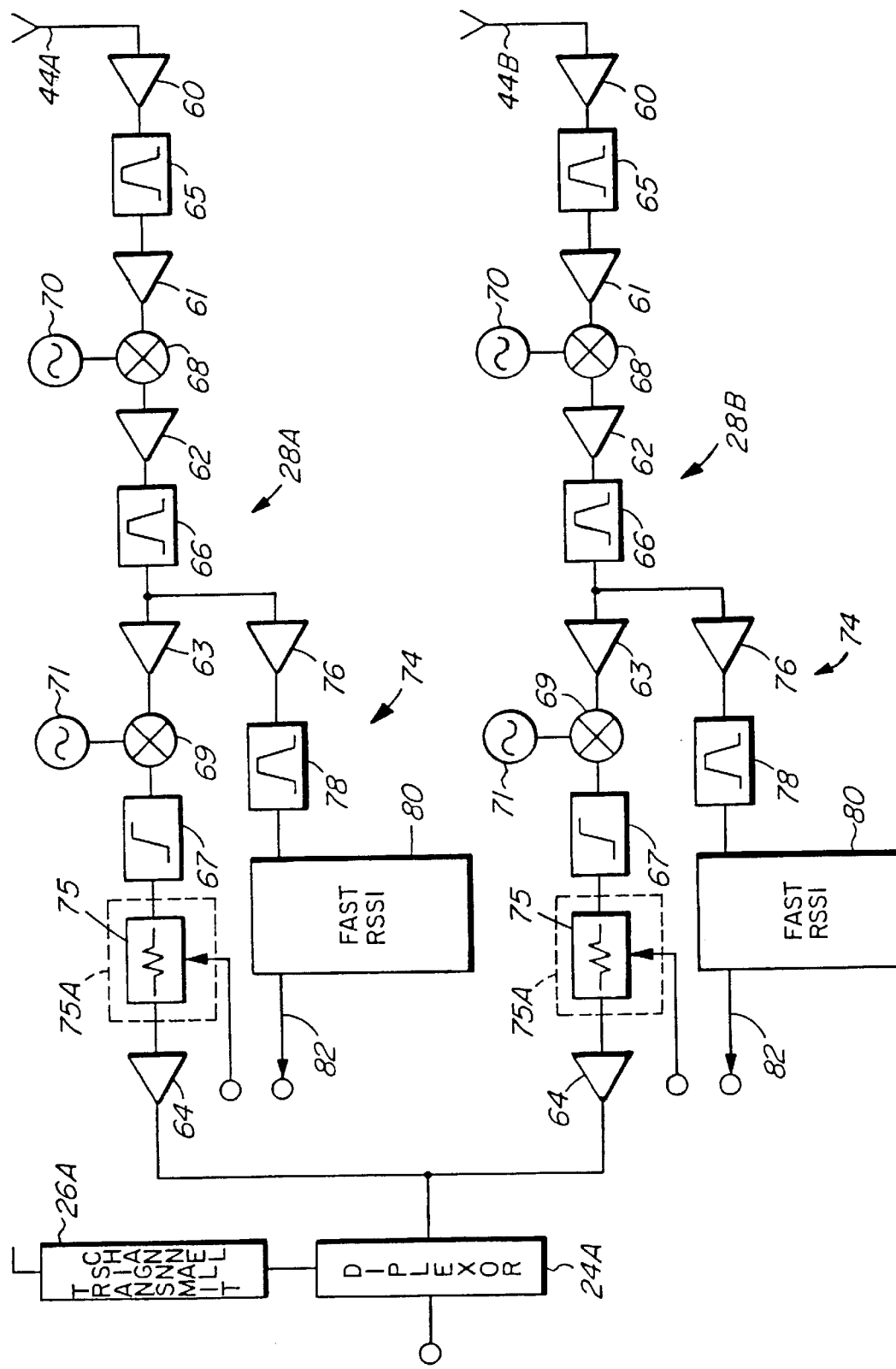
FIG. 5 shows a block diagram of one of the RF repeaters of FIG. 2.

FIG. 5 shows in greater detail the RF repeater 16A of FIG. 2. Since the RF repeater 20A is similar in construction and operation to the RF repeater 16A, the RF repeater 20A is not illustrated and described in detail herein and, accordingly, it is to be understood that the following description of the RF repeater 16A also applies to the RF repeater 20A.

The RF repeater 16A has a transmit signal path 26A which is similar to the transmit signal path 26 of FIG. 4 and which, therefore, will not be described herein in greater detail. Also, the RF repeater 16A of FIG. 5 has a first receive signal path indicated generally by reference numeral 28A and a second receive signal path indicated generally by reference numeral 28B, which are each similar to the receive signal path 28 of FIG. 4 and the components of which have been identified by the same reference numerals as those employed in the signal path 28 and, therefore, will not be described in further detail herein.

The first and second receive signal paths 28A and 28B are each connected at one end thereof to a respective one of the antennas 44A, 44B and, at an opposite end thereof, to a diplexer 24A. In each of the signal paths 28A and 28B, the relative signal strength indicator circuit 80 is connected to the microprocessor 56, which is also connected to the respective attenuator 75.

In operation of the RF repeater 16A of FIG. 5, the receive signals on the two receive signal paths 28A and 28B are attenuated, if necessary, by the attenuators 75 and are supplied to the diplexer 24A at two different frequencies determined by the two phase locked loop synthesizers, to the cable 14. The commercially available base station 10A, which has separate inputs for the two receive signals and which is capable in known manner of effecting diversity selection of one of the two receive signals, then processes the selected receive signal for connection to the public switched telephone network.

If required, the attenuators 75 of FIGS. 4 and 5 may be replaced by the squelch circuits 75A for squelching any receive signal which is found to be below a predetermined signal level.

Figure 5A:
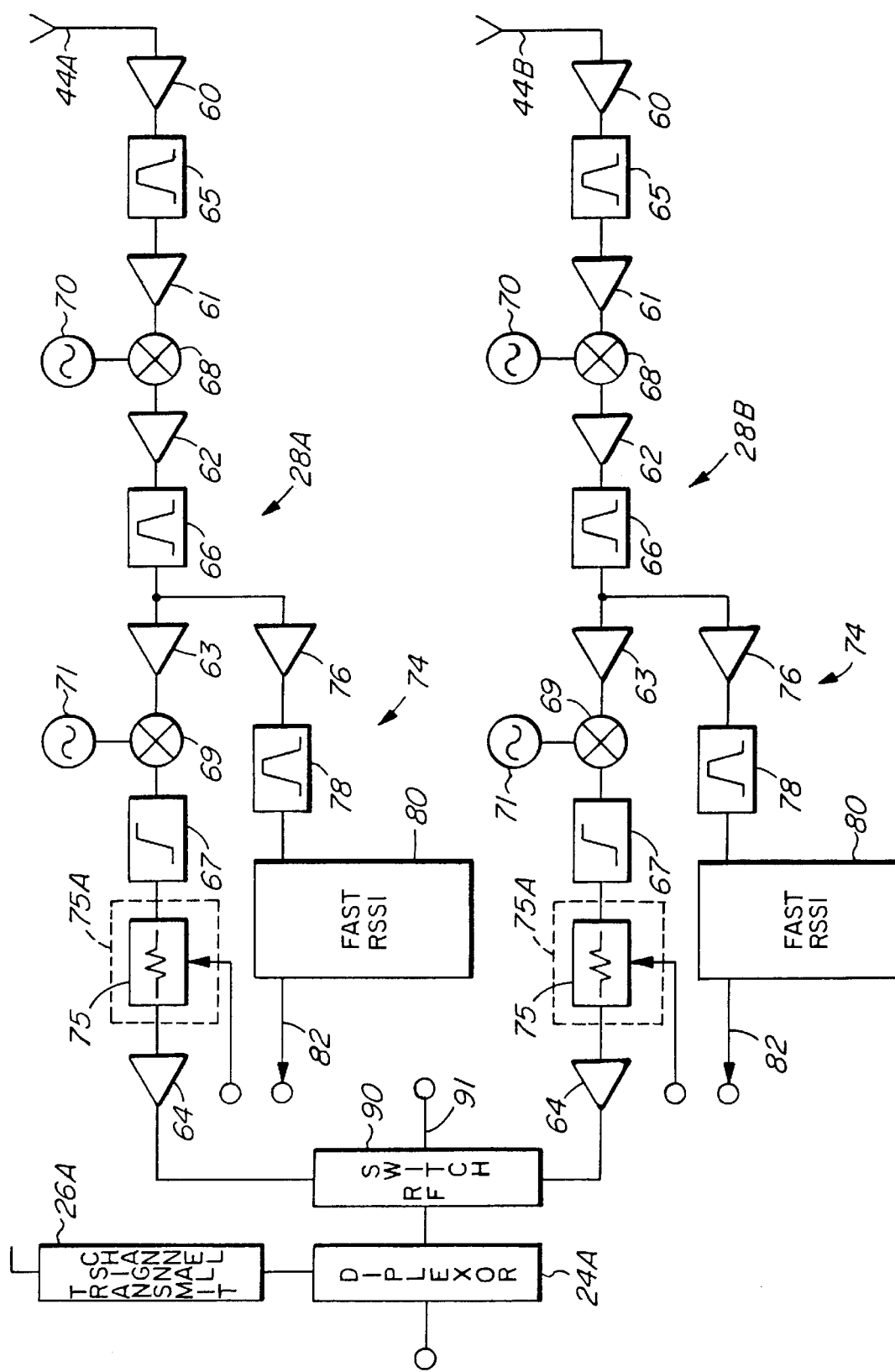
FIG. 5A shows a modification of the RF repeater of FIG. 5.

FIG. 5A shows a modification of the RF repeater 16A of FIG. 5, which effects diversity selection of the two receive signals within the RF repeater and, thus, effects diversity selection of the two radio signals received by the antennas 44A and 44B before connecting the selected receive signal to the cable 14.

In this case, the first and second receive signal paths 28A and 28B are each connected to an RF switch 90, which has an input connected by a conductor 91 to the microprocessor 56. Under the control of the microprocessor 56, and in accordance with the outputs of the signal level detectors 74 of two receive signal paths 28A and 26B, the RF switch 90 connects that one of the receive signal paths 28A and 28B which has the strongest signal level to a duplexor 24A, which in turn is connected to the CATV plant.

The spatial diversity obtained by spacing apart the two antennas 44A and 44B is in this way employed to counteract the effect of path fading which could occur with the use of a single antenna. The RF repeater of FIG. 5 can therefore be employed, by locating the antennas 44A and 44B an optimum distance apart from one another, to extend the reception coverage of the RF repeater, without any need to pass both of the receive signals, i.e. the receive signals from both of the antennas 44A and 44B, through the CATV plant to the base station 10. In this way, diversity selection is employed at the RF repeater to select the best of the two radio receive signals received by the antennas 44A and 44B.

Figure 6:
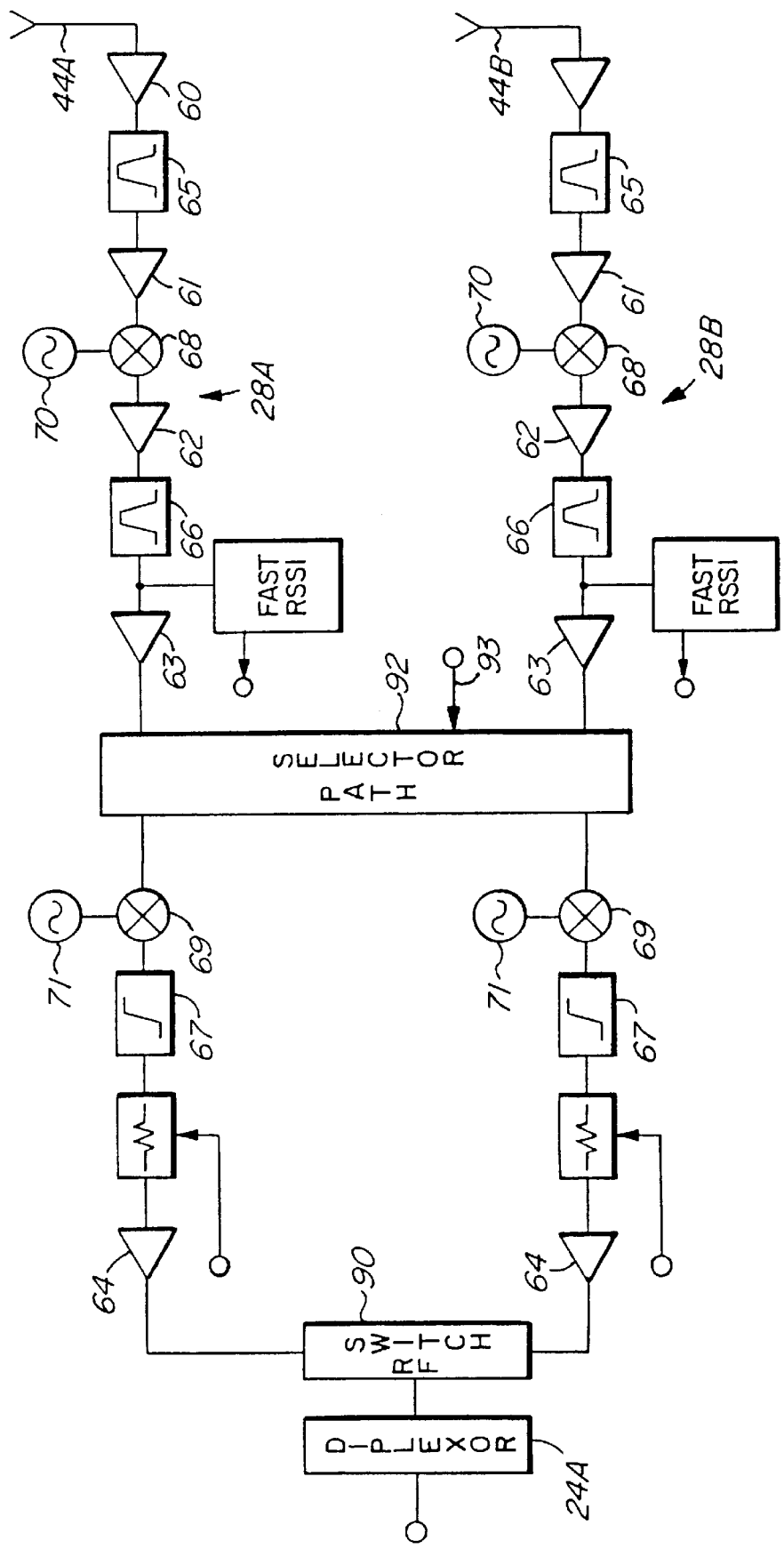
FIG. 6 shows a block diagram of a modification of the RF repeater of FIG. 5A.

FIG. 6 shows a modification of the RF repeater of FIG. 5A, in which a path selector 92, which has an input 93 connected to the microprocessor 56 (FIG. 3) and which is controlled by the microprocessor 56, is connected to the receive signal paths 28A and 28B intermediate the input and output ends thereof.

In a first switched state, the path selector 92 connects the input end of the receive signal path 28A to the output end thereof, and the input end of the receive signal path 28B to the output end thereof.

In a second switched state, the path selector 92 connects the input end of the receive signal path 28A to the output ends of both receive signal paths 28A and 28B, and disconnects the input end of the receive signal path 28B. This allows the signal received by antenna 44A, if found to be better than that received by antenna 44B, to be output from both receive signal paths 28A and 28B, under the control of the microprocessor 36.

In a third switched state, the path selector 92 connects the input end of the receive signal path 28B to the output ends of both receive signal paths 28A and 28B.

In a fourth switched state, the path selector 92 connects the input end of the receive signal path 28A to the output end of the receive signal path 28B, and vice versa, thus allowing the two paths to be switched for test and reference purposes.

Figure 7A:
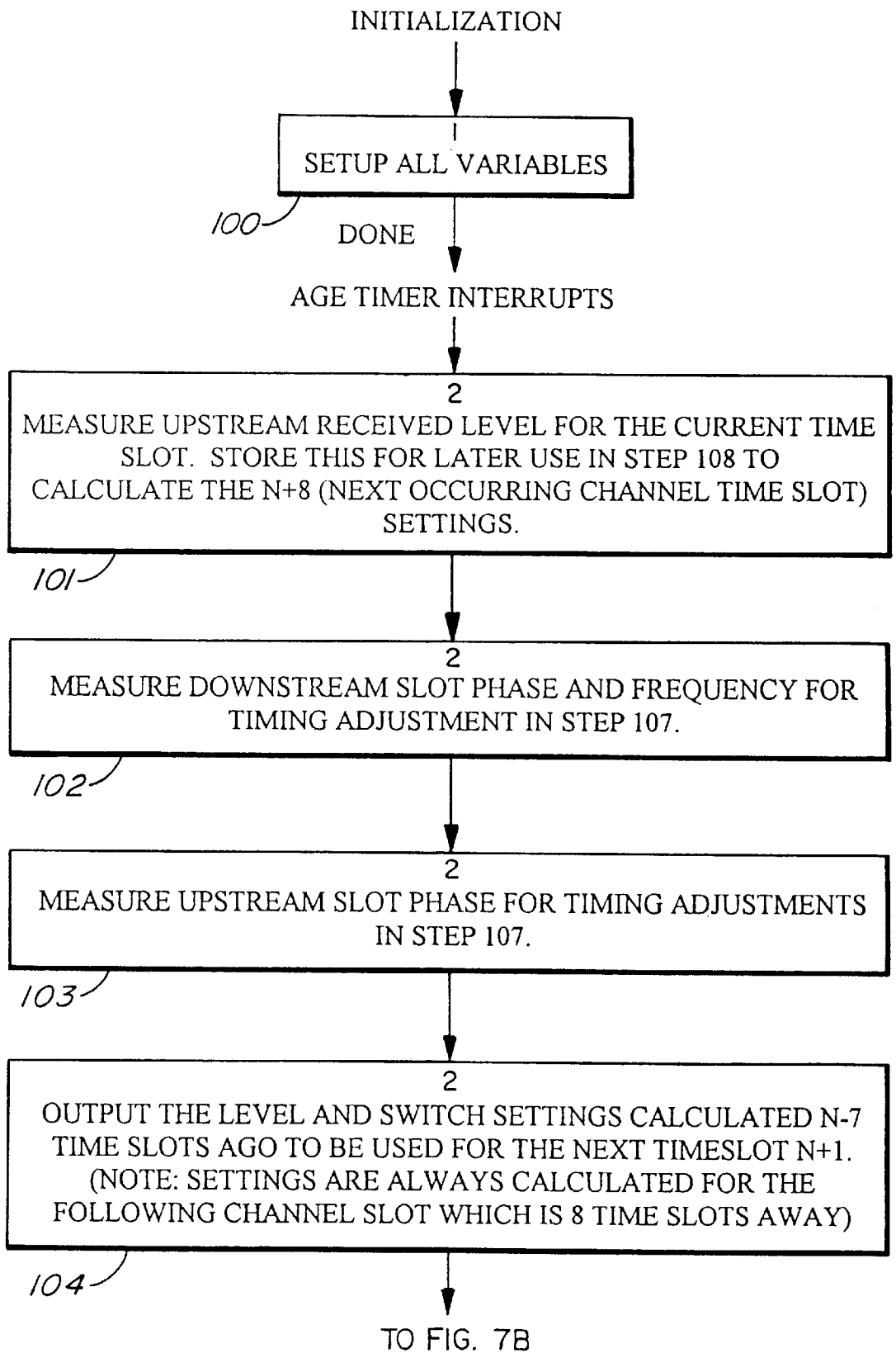
FIGS. 7A and 7B shows a flow chart of the program of a microprocessor forming part of the apparatuses of FIGS. 4 through 5A.
Figure 7B:
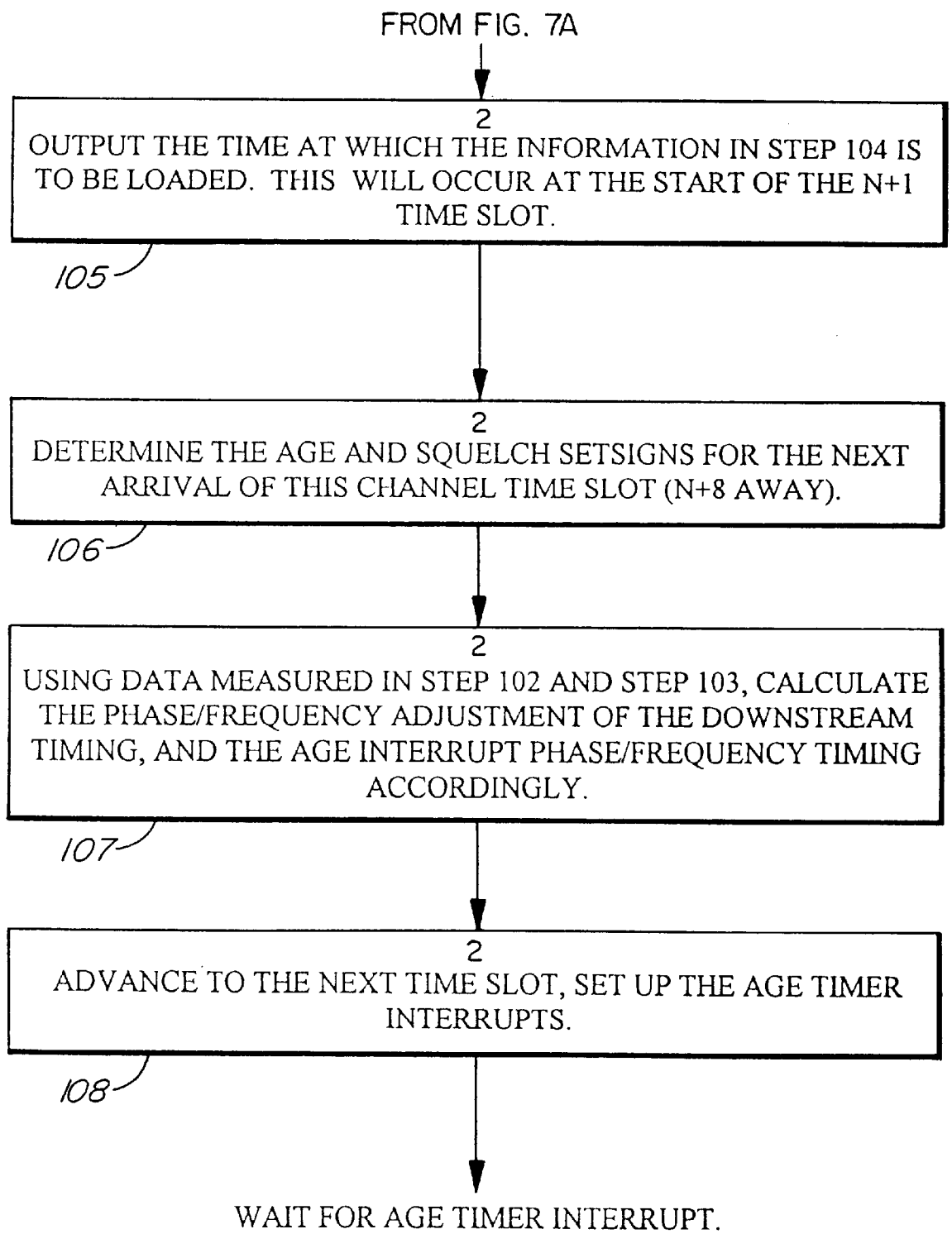

The operation of the microprocessor 56 of FIG. 4, for the case in which the squelch 75A is employed, is illustrated by the flow chart of FIGS. 7A and 7B.

As shown in FIGS. 7A and 7B, in the initialization step 100, all variables are set up in the microprocessor 56. An age timer interrupt, obtained as described below, then causes the output of the RSSI 80 to be taken as a measure of the signal for the current timeslot of the next occurring channel timeslot (8 timeslots away or N+8).

At step 102, the phase and frequency of the downstream timeslot, i.e. the timeslot of the transmit signal, is sampled for use later in step 107. At step 103 the upstream or receive signal phase is sampled, again for use later is sep 107.

At step 104, the level and switch settings calculated 7 timeslots ago (N−7), which are to be used for the next timeslot (N+1), are then output to a register, but not loaded yet.

At step 105, the time at which the register (from 104) will be loaded is output. This will occur at the start of the N+1 timeslot.

The age and squelch settings for the next arrival of the channel timeslot (8 timeslots away, or N+8) are determined at step 106.

Using data measured in step 102 and step 103, step 107 calculates the phase/frequency adjustment of the downstream timing, and adjusts the age interrupt phase/frequency accordingly.

At step 108 the program advances to the next timeslot and sets up the age timer interrupts, then waits for the next age timer interrupt.

The source for the program illustrated by the flow chart of FIGS. 7A and 7B is attached hereto as APPENDIX I.

Figure 8:
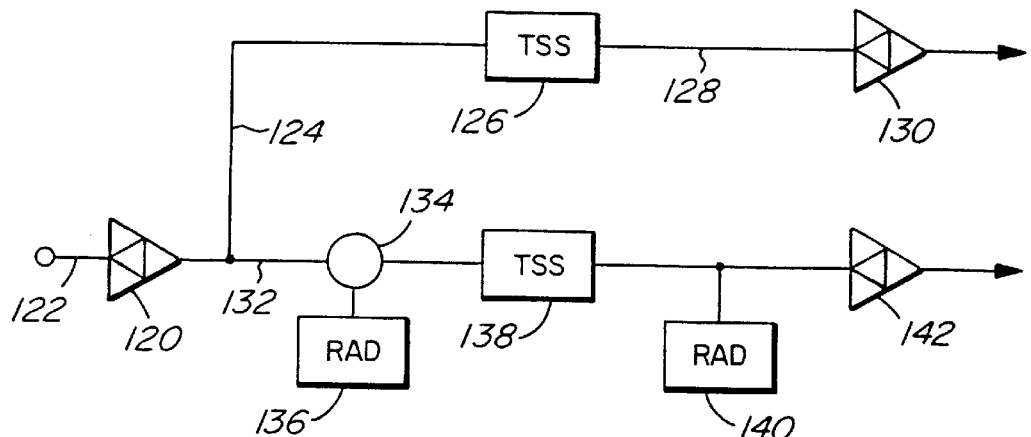
FIG. 8 shows a block diagram of another RF repeater arrangement.

FIG. 8 shows another RF repeater arrangement according to the present invention.

In the arrangement of FIG. 8, there is shown a bi-directional amplifier 120, which is connected to a RASP (not shown) by a CATV plant, which in the present embodiment is represented by a coaxial cable 122.

The amplifier 120 is connected through a coaxial cable 124 to a time slotted squelch circuit (TSS) 126, which in turn is connected by cable 128 to a further bi-directional amplifier 130 serving one or more RADS (not shown).

The bi-directional amplifier 130, which serves to amplify transmit signals passing through the cable 128 to the RAD or RADS, and also to amplify the receive signal from the latter in the upstream path, adds noise in both directions at all frequencies, including those occupied by the RAD upstream or receive signal path. The purpose of the time slotted squelch circuit 126 is to squelch a frequency band in the upstream path on the cable 128 when there is no receive signal in that frequency band, as described in greater detail below.

The amplifier 120 is also shown as being connected by co-axial cable 132 through a coupler 134 to a RAD 136 and through a time slotted squelch (TSS) 138 to a RAD 140 and a bidirectional amplifier 142, which in turn is connected to one or more further RADs.

The purpose of the time slotted squelch 138 is to squelch a predetermined frequency band in the upstream or receive signal channel of the cable 136 when no receive signal is passing through the cable 132 and, thus, to prevent noise which would otherwise be produced by the amplifier 142 on the upstream signal channel.

The squelch frequency band of the time slotted squelch circuit 126 is selected so that all upstream signals required on the cable 128 which are for the CATV plant are passed through the cable 124 to the cable 122 except those in the frequency band employed for the upstream or receive signal channel, so that the noise introduced by the amplifier 130 in this frequency band is eliminated from the cable 122 and, thus, from the RASP (not shown), when no receive signal is present on the cable 128.

Likewise, the time slotted squelch 138 eliminates noise in the preselected frequency band to the right of the time slotted squelch 138, as viewed in FIG. 8, when no receive signal is present on the cable 132. However, when a receive signal is passing from the amplifier 142 towards the amplifier 120, the squelching of this selected frequency band by the time slotted squelch 138 is interrupted so that the receive signal, and the accompanying noise, will be passed through to the RASP.

Thus, the squelching of the predetermined frequency band serves to squelch noise in the selected frequency band in any part of the cable plant that is not carrying a receive signal.

Figure 9:
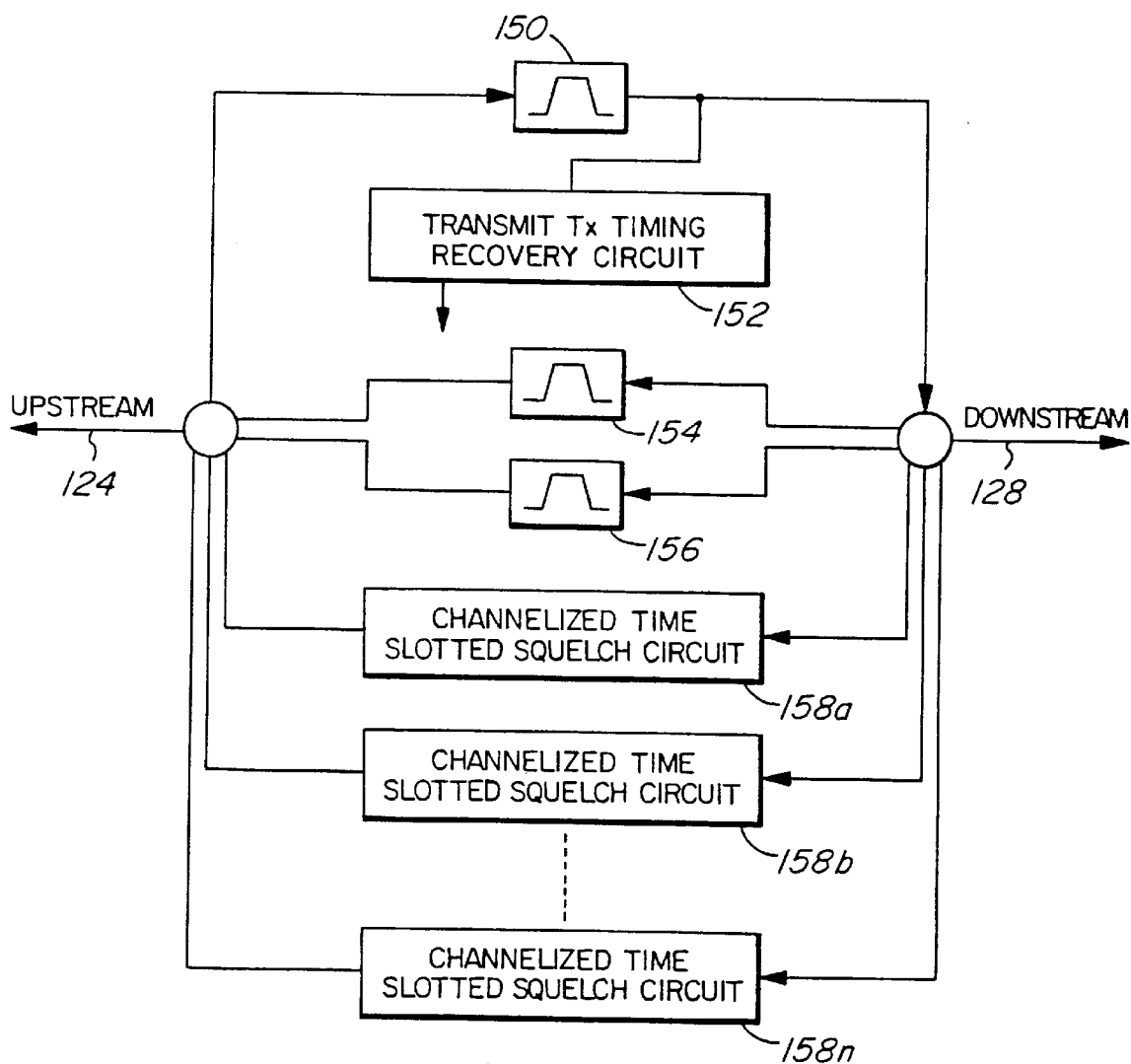
FIG. 9 shows a block diagram of one of the components of the arrangement of FIG. 8.

FIG. 9 shows in greater detail the time slotted squelch 126, and since the time slotted squelch 138 is similar to the time slotted squelch 126, it is to be understood that the following description of FIG. 9 also applies to the time slotted squelch 138.

As shown in FIG. 9, the cable 124 is connected through a high-pass filter 150 to the cable 128 for passing the transmit signal through the time slotted squelch 126 in the downstream direction. A transmit timing recovery circuit 152, which is similar to the transmit signal timing detector 46 of FIG. 4, taps off a small portion of the transmit signal for the purpose of transmit timing recovery, as described above. This transmit timing information is made available to all channelized receiver portions in the time slotted squelch 126 to enable time slotted squelching to be effected.

Two additional bandpass filters 154 and 156 allow frequencies which are not in the upstream frequency band of the receive signal to pass through the time slotted squelch 126 without being attenuated.

The time slotted squelch 126 also incorporates a plurality of channelized time slotted squelch circuits 158a, 158b . . . 158n for controlling the passage of receive signals in corresponding frequency bands, and the squelching of these frequency bands if required by the presence of a RAD upstream signal.

Figure 10:
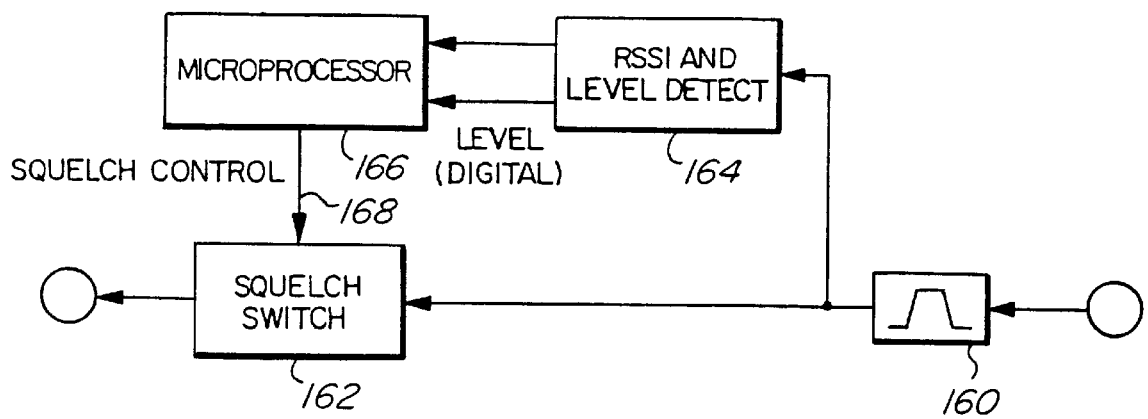
FIG. 10 shows a block diagram of part of the component of FIG. 9.

FIG. 10 shows in greater detail one of the channelized time slotted squelch circuits 158a–n of FIG. 9.

As can be seen from FIG. 10, a filter 160 filters the frequencies and the respective selected frequency band, which are connected to a squelch switch 162, the output of which is connected to the upstream cable 124.

A relative signal strength indicator and level detector circuit 164 provides signal level information, representing the level of the signal through the filter 160 to a microprocessor 166, to which the transmit timing from the transmit timing recovery circuit 152 is also supplied and which has an output 168 for controlling the operation of the squelch switch 162.

We claim:

1. A method of exchanging time division multiple access (TDMA) signals between a base station and a mobile TDMA handset, comprising the steps of:

supplying TDMA transmit signals from said base station through a signal conduit to a remote RF repeater;

detecting the timing of said transmit signals at said RF repeater;

broadcasting said transmit signals as radio signals from said RF repeater to said handset;

broadcasting TDMA receive signals from said handset to said RF repeater;

the timing of said receive signals being determined by said transmit signals at said handset;

receiving said receive signals at a pair of spaced-apart antennas connected to said RF repeater to provide corresponding first and second receive signals at said RF repeater;

employing the timing of said transmit signals to detect the signal levels of said first and second receive signals at said RF repeater;

processing said detected signal levels of said first and second receive signals to provide a control output;

employing said control output to alter the signal level of at least one of said first and second receive signals; and supplying at least one of said receive signals from said RF repeater to said base station.

2. A method as claimed in claim 1, wherein the step of employing the control output to alter said signal level of at least one of said first and second receive signals comprises attenuating said at least one of said first and second receive signals.

3. A method as claimed in claim 1, wherein the step of employing the control output to alter said signal level of at least one of the first and second receive signals comprises squelching that one of said first and second receive signals which has the lowest signal level.

4. A method of exchanging time division multiple access signals between a base station and a mobile handset, comprising the steps of:

supplying transmit signals from said base station through a signal conduit to a RF repeater;

detecting the timing of said transmit signals at said RF repeater;

broadcasting said transmit signals as radio signals from said RF repeater to said handset;

broadcasting receive signals from said handset to said RF repeater;

the timing of said receive signals being determined by said transmit signals at said handset;

receiving said receive signals at a pair of spaced-apart antennas connected to said RF repeater to provide corresponding first and second receive signals at said RF repeater;

frequency converting said first and second receive signals to different first and second frequencies at said RF repeater;

supplying both of said first and second receive signals at said first and second frequencies from said RF repeater through said signal conduit to said base station; and effecting diversity selection of the first and second receive signals at said base station.

5. A method as claimed in claim 1, wherein the step of processing said detected signal levels of said first and second receive signals comprises determining which of said first and second receive signals has the lowest signal level, and the step of altering the signal level of at least one of said first and second receive signals comprises increasing said lowest signal level, said method further comprising frequency converting said first and second receive signals to different first and second frequencies at said RF repeater, supplying both of said first and second receive signals at said first and second frequencies from the RF repeater through said signal conduit to said base station and effecting diversity selection of the first and second receive signals at said base station.

6. A method as claimed in claim 3, further comprising frequency converting the other of said first and second receive signals to third and fourth receive signals having different frequencies, supplying said third and fourth receive signals through said signal conduit to said base station and effecting diversity selection of said third and fourth receive signals at said base station.

7. A cordless time division multiple access (TDMA) telephone system, comprising:

a mobile TDMA handset;

an RF repeater for exchanging TDMA transmit and receive signals as radio signals with said handset;

a signal conduit connected to said RF repeater;

a base station interfacing with a public switched telephone network;

a remote antenna signal processor (RASP) connected between said base station and said signal conduit;

said RF repeater having a signal timing detector device responsive to transmit signals sent from said RASP through said signal conduit to a remote antenna driver for detecting the timing of said transmit signals and a pair of spaced-apart antennas for broadcasting said transmit signals to said handset and for receiving receive signals from said handset and first and second signal paths connected to respective ones of said antennas;

said first and second signal paths including signal level detectors for detecting the signal levels of said receive signals; and a processor connected to said signal timing detector and to said signal level detectors and responsive to said transmit signal timing and to said signal levels to provide a control output; and each of said first and second signal paths having a signal control device responsive to said processor for controlling to level of the receive signal in the respective signal path.

8. A cordless time division multiple access telephone system as claimed in claim 7, wherein said signal level control devices comprise squelch circuits.

9. A cordless time division multiple access telephone system as claimed in claim 7, wherein said signal level control devices comprise attenuators.

10. A cordless telephone system as claimed in claim 7, wherein said first and second signal paths include a pair of frequency converters for converting said receive signals on said first and second signal paths to first and second frequencies, respectively, for transmission as separate signal channels through a CATV plant and wherein said base station comprises means for effecting diversity selection of said signal channels.

11. A cordless telephone system as claimed in claim 10, wherein said RF repeater includes a path selector controlled by said processor and interconnecting said first and second signal paths, whereby only that one of said first and second signal paths selected by said processor as carrying a higher receive signal level than the other is connected to both frequency converters.

12. A cordless time division multiple access (TDMA) telephone system, comprising:

a mobile TDMA handset;

an RF repeater for exchanging TDMA transmit and receive signals as radio signals with said handset;

a signal conduit connected to said RF repeater;

a base station interfacing with a public switched telephone network;

a remote antenna signal processor (RASP) connected between said base station and said signal conduit;

said RF repeater having a signal timing detector device responsive to transmit signals sent from said RASP through said signal conduit to said RF repeater for detecting the timing of said transmit signals;

said RF repeater having a pair of spaced-apart antennas for broadcasting said transmit signals to said handset and for receiving receive signals from said handset and first and second signal paths connected to respective ones of said antennas;

said first and second signal paths including a pair of frequency converters for converting said receive signals on said first and second signal paths to first and second frequencies, respectively, for transmission as separate signal channels through said signal conduit; and said base station comprising means for effecting diversity selection of said signal channels.

13. An RF repeater arrangement for exchanging time division multiple access (TDMA) telephone signals with a mobile handset, comprising:

a RF repeater for broadcasting a TDMA transmit signal to said handset as a radio signal and receiving a TDMA receive signal, as a radio signal, from said handset;

a signal conduit connected to said RF repeater for transporting said transmit signal to said RF repeater and for transporting said receive signal from said RF repeater in a predetermined frequency band;

an amplifier connected to said signal conduit for amplifying said receive signal;

a squelch circuit connected to said signal conduit upstream from said amplifier;

said squelch circuit being operable to squelch said predetermined frequency band;

a timing detector for detecting the timing of said transmit signal as an indication of the timing of said receive signal;

a signal level detector responsible to the presence and absence of said receive signal; and a processor connected to said timing detector, said level detector and said squelch circuit and responsive to absence of said receive signal for causing said squelch circuit to squelch said predetermined frequency band.

14. A method of reducing noise in a signal conduit employed for transporting time division multiple access (TDMA) telephone signals, comprising:

detecting the timing of a transmit signal on said signal conduit as an indication of the timing of a receive signal broadcast to said signal conduit from a mobile handset which determines the timing of said receive signals in accordance with said transmit signal, said receive signal being within a predetermined frequency band;

detecting absence of said receive signals in said signal conduit; and squelching said predetermined frequency band in response to the absence of said receive signal in said signal conduit.

* * * * *

UNITED STATES PATENT AND TRADEMARK OFFICE
CERTIFICATE OF CORRECTION

PATENT NO. : 5,924,022
DATED : July 13, 1999
INVENTOR(S) : Andrew Beasley; Dean Schebel It is certified that error appears in the above-identified patent and that said Letters Patent is hereby corrected as shown below:

Title page, item [57],
Abstract, line 3, delete "has" and insert --having--

Column 6, line 67, delete "is sep" and insert --in step--

Column 10, line 25, delete "to" and insert --the--

Signed and Sealed this

Sixth Day of February, 2001

Attest:

Attesting Officer

Q. TODD DICKINSON
Director of Patents and Trademarks